(12) United States Patent
Miller

(10) Patent No.: US 8,900,453 B2
(45) Date of Patent: Dec. 2, 2014

(54) PLANT OIL EXTRACT DEVICE AND METHOD FOR USING THE SAME

(76) Inventor: Samuel S. Miller, San Francisco, CA (US)

( * ) Notice: Subject to any disclaimer, the term of this patent is extended or adjusted under 35 U.S.C. 154(b) by 1067 days.

(21) Appl. No.: 12/910,365

(22) Filed: Oct. 22, 2010

(65) Prior Publication Data

US 2011/0100894 A1   May 5, 2011

Related U.S. Application Data

(60) Provisional application No. 61/254,117, filed on Oct. 22, 2009.

(51) Int. Cl.
- *B01D 29/085* (2006.01)
- *B01D 29/00* (2006.01)
- *B01D 35/30* (2006.01)
- *B01D 11/02* (2006.01)

(52) U.S. Cl.
CPC .................................. *B01D 11/0219* (2013.01)
USPC ........... 210/232; 210/406; 210/482; 422/267; 422/274; 422/275

(58) Field of Classification Search
USPC ........... 210/232, 406, 482; 422/267, 274, 275
See application file for complete search history.

(56) References Cited

U.S. PATENT DOCUMENTS

| | | | | |
|---|---|---|---|---|
| 203,981 | A * | 5/1878 | Adamson et al. | 422/275 |
| 761,828 | A * | 6/1904 | Hampton | 422/269 |
| 3,788,483 | A * | 1/1974 | Conway | 210/416.1 |
| 5,217,619 | A * | 6/1993 | Redmond et al. | 210/650 |
| 5,464,541 | A * | 11/1995 | Aysta et al. | 210/767 |
| 5,849,249 | A * | 12/1998 | Jones et al. | 422/535 |
| 2004/0072375 | A1 * | 4/2004 | Gjerde et al. | 436/541 |

FOREIGN PATENT DOCUMENTS

| | | | |
|---|---|---|---|
| DE | 3220121 A1 | * | 12/1983 |
| DE | 3711735 C1 | * | 10/1988 |
| EP | 857961 A2 | * | 8/1998 |
| FR | 2273573 A | * | 2/1976 |

* cited by examiner

*Primary Examiner* — Thomas M Lithgow

(74) *Attorney, Agent, or Firm* — Zarley Law Firm, P.L.C.

(57) ABSTRACT

A plant oil extraction device that has a main body member with a hollow interior that receives a plant. A filter member is removably mounted on the main body and has a groove therein that receives glass frit. Thus, when a solvent is placed in the hollow interior with the plant the glass frit filters the plant particulate allowing plant oil and solvent to flow into a receiving vessel. Once the oil is collected the filter member may be removed from the main body such that the glass frit can be cleaned of all plant particulate and be reused.

8 Claims, 2 Drawing Sheets

PLANT OIL EXTRACT DEVICE AND METHOD FOR USING THE SAME

CROSS REFERENCE TO RELATED APPLICATION

This application claims the benefit of U.S. Provisional Application No. 61/254,117 filed Oct. 22, 2009.

BACKGROUND OF THE INVENTION

This invention relates to plant oil extraction. Specifically, this invention relates to a system for extracting oils from a plant and a method for using the same.

Plants naturally produce an oil wherein the oil of some plants have been shown to provide advantages in the medicinal arts. Typically, from the breakdown of a plant the oil is collected or a solvent is added to a plant in order to dissolve the plant to extract the desired medicinal essential oil.

While these methods that are used are able to extract the plant oil problems occur because plant particulates other than the pure plant oil end up within the plant oils thus preventing pure plant oil from being extracted. These particulates thus minimize the effectiveness of the plant oil for medicinal purposes that can lead to undesired additional filtering causing inefficiencies in the processing of the plant oil. In addition, oftentimes devices used to filter the plant oils are of one piece construction and are difficult to clean.

Therefore, a principal object of the present invention is to provide a plant oil extraction device that maximizes the filtering of plant oil.

These and other objects, features, or advantages of the present invention will become apparent from the specification and claims.

BRIEF SUMMARY OF THE INVENTION

A plant oil extraction device that has a main body member that has a hollow interior for receiving a plant and receives solvent through a stopcock. Attached to the main body member is a connecting member that removably attaches a filter member to the main body member. The filter member has a groove therein for receiving glass frit such that the glass frit filters the plant particulate as plant oil flows through the glass frit into a receiving vessel.

DETAILED DESCRIPTION OF THE PREFERRED EMBODIMENT

Figure 1:
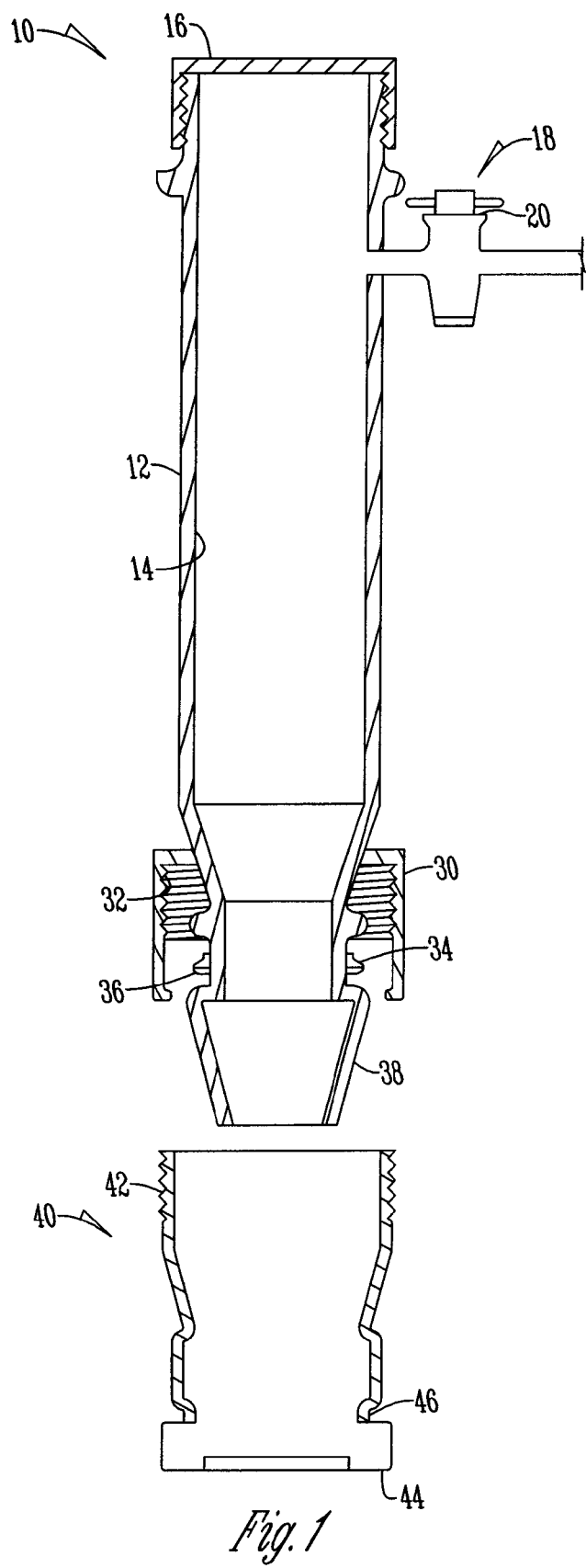
FIG. 1 is a side plan view of a plant oil extraction device.
Figure 2:
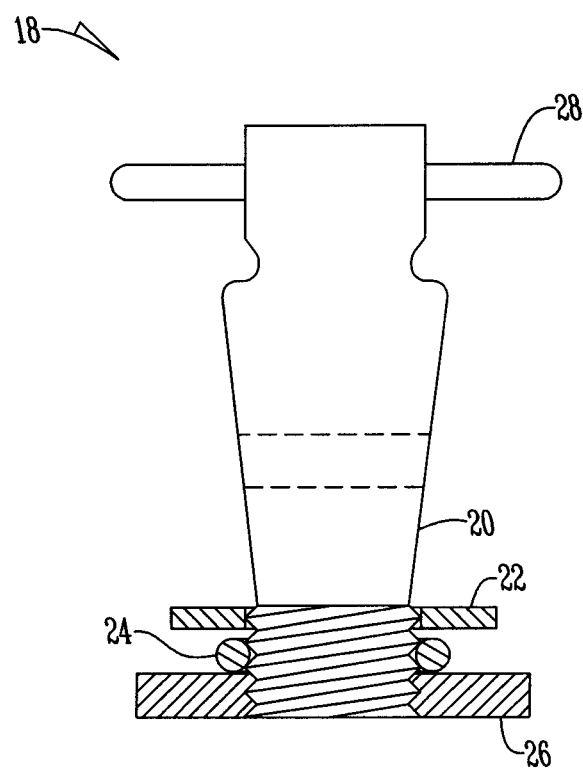
FIG. 2 is a side plan view of a stopcock of a plant oil extraction device.

The figures show a plant oil extraction device 10 that is comprised of a main body member 12 having a hollow interior chamber 14, a removable cap 16 and a stopcock 18 that provides a fluid connection to a reservoir. In one embodiment the main body member 12 is a glass tube. The stopcock 18 contains a valve body 20 that utilizes a washer 22, a coring 24, nut 26, and actuating device 28 so that when the actuating device 28 is in an open position solvent flows from the reservoir to within the hollow interior chamber 14. When the actuating device 28 is in a closed position the fluid flow path is closed.

At an end opposite to the stopcock 18 a connecting member 30 is attached to the main body member. In a preferred embodiment the connecting member 30 surrounds the main body and has interior threads 32. While shown as having interior threads 32 in this embodiment the connecting member 30 may embody other connection means. Also surrounding the main body member adjacent the connecting member 30 is a washer 34 and O-ring 36. The main body member 12 adjacent the connecting member 30 tapers inwardly so that oil and solvent flowing from within the interior chamber of the main body is directed out of a tapered end 38.

A filter member 40 having a threaded exterior 42 that coincides with the threads 32 of the connecting member 30 is attached to the main body member 12. The filter member 40 is also tapered to conform to the shape to the tapered end of the main body member 12. The filter member 40 additionally has a groove 44 formed therein for receiving a glass frit material therein. The glass frit has various perocities such as extra-coarse, coarse, P1, P2, P3 P4, and the like. In a preferred embodiment the glass frit is an extra coarse material of particulate of glass that is used to filter out any fluid flowing therethrough. The filter member 40 also has an exterior flange 46 at the end opposite the threaded exterior. The flange 46 provides a connection for a vacuum to be attached to the filter member 40. Alternatively, instead of using a vacuum a receiving vessel can be placed underneath the filter member 40 so that plant oil flowing through the glass frit can be collected.

In operation, when one desires to extract plant oil from a plant an individual takes the filtering member 40 and threadably secures the filtering member 40 to the main body member 12 via the connecting member 30. The connecting member 30 places the filtering member 40 in a desired location so that the main member 12 and filtering member 40 can be heated to form a heat seal between the main member 12 and the filtering member 40 in order to provide a sealable and air tight connection.

The cap 16 of the main member 12 is then removed and the plant that is desired to have its oils extracted is placed within the interior chamber 14 of the main member 12. The cap 16 is securely tightened and placed on the main body member 12 again in order to create an air tight seal. At this time the actuating device 28 of the stopcock 18 opens a fluid flow path to the interior chamber to place a solvent into the chamber to mix with the plant. Once the solvent is added or alternatively, as the plant begins to break down, a combination of plant oil and plant particulate begins flowing through the glass frit within the filter member 40. Because the glass frit is extremely coarse the plant particulate is sufficiently filtered causing a purified plant oil to flow to a receiving vessel.

Once in the receiving vessel the solvent evaporates thus leaving only a purified form of the plant oil. In one embodiment a vacuum is attached to the flange of the filter member 40 instead of using a receiving vessel to provide compression within the interior chamber in order to speed up the process. After the plant oil is extracted an individual detaches the main body member 12 from the filter body 40 and cleans the glass frit within an oven to eliminate all plant particulate off the glass frit. Thus, the glass frit can be reused for multiple applications.

Thus, provided is a plant oil extraction device that efficiently produces purified plant oil. In addition, because the device has two pieces the devices is easily cleaned. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A plant oil extraction device comprising:
   a main body member having a hollow interior for receiving a plant;
   a removable cap threadably received at one end of the main body member;
   a filter member removably mounted on the main body member and having a groove therein and having a glass frit and said filter member having a groove therein for receiving said glass frit;
   wherein when a solvent is placed in the hollow interior with the plant the glass frit filters plant particulate allowing plant oil and solvent to flow into a receiving vessel; and
   an airtight heat seal formed between the main member and the filter member.

2. The plant oil extraction device of claim 1 wherein the main body member has a stopcock that allows and prevents the flow of solvent into the hollow interior of the main body member.

3. The plant oil extractor device of claim 1 wherein the main body member and filter member are tapered to provide a sealing connection between the main body member and filter member.

4. The plant oil extractor device of claim 1 further comprising a connecting member on the main body member that secures the filter member to the main body member.

5. The plant oil extractor device of claim 4 wherein the connecting member has threads that secure the filter member to the main body member.

6. The plant oil extractor device of claim 2 further comprising the stopcock having a valve body that includes a washer, a coring, a nut, and an actuating device.

7. The plaint oil extractor of claim 4 further comprising an O-ring and surrounding the main body member adjacent the connecting member.

8. The plaint oil extractor of claim 1 wherein the glass frit is made of extra coarse material.

* * * * *